United States Patent [19]

Schreiber et al.

[11] Patent Number: 5,523,336
[45] Date of Patent: Jun. 4, 1996

[54] AQUEOUS, ONE-COMPONENT COATING COMPOSITION AND USE THEREOF IN PROCESSES FOR REPAIR LACQUER COATING OF PLASTIC SUBSTRATES

[75] Inventors: Peter Schreiber, Hattingen; Udo Hellmann, Remscheid; Werner Stephen; Michael Prescher, both of Wuppertal, all of Germany

[73] Assignee: Heberts GmbH, Wuppertal, Germany

[21] Appl. No.: 389,638

[22] Filed: Feb. 16, 1995

[30] Foreign Application Priority Data

Feb. 18, 1994 [DE] Germany .................. 44 05 148.4

[51] Int. Cl.⁶ .................. C08K 3/20; C08L 63/02
[52] U.S. Cl. .................. 523/406; 523/403
[58] Field of Search .................. 523/406, 403

[56] References Cited

U.S. PATENT DOCUMENTS 4,987,163  1/1991  Becher et al. .................. 523/414

FOREIGN PATENT DOCUMENTS

0539710A1  5/1993  European Pat. Off. .
3910901A1  10/1990  Germany .
4226968A1  8/1993  Germany .
54-153832  12/1979  Japan .

*Primary Examiner*—Melvyn I. Marquis
*Assistant Examiner*—D. Aylward
*Attorney, Agent, or Firm*—Merchant & Gould, Smith, Edell, Welter & Schmidt

[57] ABSTRACT

The invention is directed to an aqueous coating composition composed of chlorinated polyolefins and one or more waterborne, self-emulsifying epoxy resins. The epoxy resin is formed from a combination of aromatic polyols, diepoxy compounds and a condensation product formed from diepoxy compounds and aliphatic polyols. The composition is free of emulsifiers yet forms homogenous mixtures in aqueous media. The composition exhibits strong bonding to plastic substrates.

10 Claims, No Drawings

AQUEOUS, ONE-COMPONENT COATING COMPOSITION AND USE THEREOF IN PROCESSES FOR REPAIR LACQUER COATING OF PLASTIC SUBSTRATES

This invention relates to aqueous, one-component coating compositions based on epoxy resins and chlorinated polyolefins, which are in particular suitable as a keying primer for coating plastic substrates.

It is known in the context of environmentally-aware operations also to use aqueous coating compositions for coating plastic substrates. It is likewise known to use chlorinated polyolefins (CPO) as adhesion promoters in such coating compositions in order to improve their adhesion to plastic substrates.

EP-A-539 710 describes, for example, aqueous coating compositions which contain chlorinated polyolefins, film-forming binders, solvents, water, pigments and/or extenders. Emulsifiers must be used in order to incorporate the chlorinated polyolefins into the aqueous coating composition. The binders described are water-dispersible polyurethane resins with a number average molecular weight ($M_n$) of 500 to 500,000.

Aqueous coating compositions for plastic components are known from DE-A-39 10 901, which contain water, a film-forming binder system, an aqueous dispersion of chlorinated polyolefins, optionally pigments and additives and an anionic emulsifier. Acrylate, alkyd and polyurethane resins are stated as film-forming binders. The aqueous dispersion of chlorinated polyolefins must be produced using a very elaborate melt process with an azeotropic distillation stage to remove all organic solvent constituents.

The as yet unpublished German patent application P 42 29 981 describes two-component epoxy/amine-based aqueous coating compositions for coating plastics. These coating compositions contain, in addition to epoxy resins, polyamine hardeners and optionally pigments and extenders, an aqueous emulsion consisting of epoxy resin, organic solvent, water and chlorinated polyolefin. The coating composition may contain further binders, preferably polyurethane resins.

The stated aqueous coating compositions exhibit good adhesion to relatively polar plastic surfaces, such as for example polyurethane, PVC, UP-GF (unsaturated polyester, glass fibre reinforced). Adhesion problems arise on relatively non-polar polyolefin substrates, for example polypropylene, EPDM (ethylene/propylene/diene copolymers). In such cases, the plastic surface must be pretreated, for example by flame treatment or plasma treatment, in order to impart to it an appropriate surface polarity.

DE-A-42 26 968 describes a priming composition for coating polyolefin substrates, which may be used without pretreating the substrate. This is, however, a non-aqueous coating composition based on an epoxy resin with a maximum water-soluble content of 50%. The composition moreover contains a very high proportion of a chlorinated polyolefin resin (100 parts by weight of CPO, 1 to 70 parts by weight of epoxy resin). The film-forming properties of these coating compositions are poor.

The object of the present invention is thus to provide aqueous coating compositions which are suitable for coating plastic substrates, in particular for repair lacquer coating, for example in automotive repair lacquer coating, wherein the coating compositions should exhibit universal adhesion even to unpretreated, in particular non-polar plastic components and should be readily overcoated with other primers.

This object is achieved by one-component coating compositions, preferably containing no emulsifier, which contain A) 1 to 40 wt. % of one or more water-borne self-emulsifying epoxy resins with an epoxy equivalent weight of between 250 and 10,000, which may be obtained by condensation of
  a) 50 to 80 wt. % of one or more epoxy compounds with an average of at least 2 epoxy groups per molecule and an epoxy equivalent weight of 100 to 2,000,
  b) 17 to 35 wt. % of one or more aromatic polyols and
  c) 3 to 15 wt. % of a condensation product prepared from one or more aliphatic polyols with a weight-average molecular weight ($M_w$) of 200 to 20,000 and one or more epoxy compounds with an average of at least 2 epoxy groups per molecule and an epoxy equivalent weight of 100 to 2,000, wherein the equivalent ratio of OH groups to epoxy groups is 1:0.85 to 1:1.5, preferably 1:0.95 to 1:1.20 and the epoxy equivalent weight of this condensation product is at least 50,000, preferably at least 100,000, B) one or more chlorinated polyolefins (CPO) in a weight ratio of epoxy resin:CPO of 10:0.5 to 10:4.5, in each case relative to the weight of resin solids, C) 40 to 90 wt % of water, D) 3 to 30 wt. % of one or more organic solvents and optionally E) pigments, extenders and customary lacquer additives, wherein the weight percentages of A), C) and D) relate to the weight of the complete aqueous coating composition and the coating compositions contain no crosslinking agents, in particular no polyamine hardeners.

The self-emulsifying epoxy resin component A) preferably has epoxy equivalent weights of 350 to 2,500, in particular of 450 to 1,500.

The epoxy compounds of component A(a) and used to produce component A(c) are, in particular, 1,2-epoxy compounds. These are polyepoxides with an average of at least two epoxy groups per molecule. These epoxy compounds may here be both saturated and unsaturated, as well as aliphatic, cycloaliphatic, aromatic or heterocyclic and may also have hydroxyl groups. They may moreover contain such substituents as cause no disruptive secondary reactions under the mixing or reaction conditions, for example alkyl or aryl substituents and ether groups.

The epoxy compounds are preferably polyglycidyl ethers based on polyhydric, preferably dihydric alcohols, phenols, hydrogenation products of these phenols and/or of novolacs (reaction products of mono- or polyhydric phenols with aldehydes, in particular formaldehyde, in the presence of acid catalysts). The epoxy equivalent weights of these epoxy compounds are preferably between 160 and 500, in particular between 170 and 250. Polyhydric phenols which may be cited by way of example are: resorcinol, hydroquinone, 2,2-bis-(4-hydroxyphenyl)propane (bisphenol A), isomeric mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxy-tert.-butylphenyl)-2,2-propane, bis-(2-hydroxynaphthyl)methane, 1,5-dihydroxynaphthalene, tris-(4-hydroxyphenyl)methane and bis-(4-hydroxyphenyl)ether, bis-(4-hydroxyphenyl)sulphone, together with the chlorination and bromination products of the above-stated compounds. Bisphenol A is particularly preferred in this connection.

The polyglycidyl ethers of polyhydric alcohols are also suitable. Examples of such polyhydric alcohols which may be cited are ethylene glycol, diethylene glycol, triethylene glycol, 1,2-propylene glycol, polyoxypropylene glycols (n=1 to 10), 1,3-propylene glycol, 1,4-butylene glycol, 1,5-pentanediol, 1,6-hexanediol, 1,2,6-hexanetriol, glycerol and bis-(4-hydroxycyclohexyl)-2,2-propane.

Polyglycidyl esters of polycarboxylic acids may also be used, as are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalene dicarboxylic acid and dimerised linolenic acid. Examples are adipic acid diglycidyl ester, phthalic acid glycidyl ester and hexahydrophthalic acid diglycidyl ester.

A comprehensive list of suitable epoxy compounds may be found in the handbook *Epoxidverbindungen und Epoxidharze* [epoxy compounds and epoxy resins] by A. M. Paquin, Springer Verlag, Berlin 1958, chapter IV and in Lee, Neville *Handbook of Epoxy Resins,* 1967, chapter 2. Mixtures of two or more epoxy compounds may also be used.

Aromatic polyols A(b) which may be considered are preferably the aromatic compounds containing OH groups as described above for components A(a) and A(c), namely polyhydric, preferably dihydric phenols, the chlorination or bromination products thereof and/or novolacs. Bisphenol A is particularly preferred in this case too.

Preferred condensation products A(c) are those prepared from the above-described epoxy compounds, in particular polyglycidyl ethers of bisphenols, with aliphatic polyols, wherein the epoxy equivalent weight of these condensation products is at least 50,000, preferably at least 100,000 and is in particular between 100,000 and 400,000. The aliphatic polyols are preferably polyether polyols (polyalkylene glycols) with weight average molecular weights ($M_w$) preferably of 600 to 12,000, in particular of 2,000 to 8,000 and OH values conveniently of 10 to 200, preferably of 20 to 60. These polyether polyols preferably have only terminal, primary OH groups. Examples which may be cited are block copolymers prepared from ethylene oxide and propylene oxide together with polyethylene glycols, polypropylene glycols, polybutylene glycols, wherein mixtures of the particular polyalkylene glycols may also be used. Polyethylene glycols are preferably used.

The condensation products A(c) may, for example, be obtained by condensation of the stated polyether polyols with the glycidyl ethers in the presence of specific catalysts at elevated temperature, in general at 50 to 200, preferably at 90° to 150° C. The two components are here used in quantities such that the equivalent ratio of OH groups to epoxy groups is preferably 1:0.95 to 1:1.20. Suitable catalysts for this purpose are, for example, boron trifluoride and the complexes thereof, for example with water, with phosphoric acid, acetic acid (1:1 and 1:2), methanol, diethyl ether, tetrahydrofuran, phenol, tricresyl phosphate, ethylene glycol monoethyl ether, polyethylene glycol (MW 200), dimethyl sulphoxide, di-n-butyl ether, di-n-hexyl ether and succinic acid; and with amines, such as for example with monoethylamine or benzylamine. Lewis acids based on other compounds, such as $SnCl_4$, are however also suitable. $BF_3$-diethyl ether and $BF_3$-acetic acid are preferably used. The quantity of catalyst is for example 0.1 to 5, preferably 0.15 to 1 wt. %, relative to the reaction mixture. In order to facilitate metering, the catalyst may be diluted in a solvent, such as for example diethyl ether, a glycol or cyclic ethers or ketones, preferably dioxane or methyl isobutyl ketone, for example to 0.5 to 20, preferably 2.5 to 12.5 wt. %.

The quantity of condensation product A(c) in the self-emulsifying epoxy resin is generally approximately 3 to 15 wt. %, preferably 4 to 9 wt. %, relative to the self-emulsifying epoxy resin.

The self-emulsifying epoxy resin may be used in the form of an aqueous epoxy resin dispersion. To this end, the self-emulsifying epoxy resin is initially produced by condensation of the three components a), b) and c) at elevated temperature in the present of a condensation catalyst and optionally solvents. Optionally further organic solvents and the appropriate quantities of water are then vigorously stirred into the solution obtained in this manner, for example at 30 to 100° C.

The quantity of water in the aqueous dispersion is approximately 30 to 55 wt. %, preferably approximately 35 to 50 wt. %, relative to the complete dispersion. Organic solvents, which may be present in quantities of 0 to 15 wt. %, for example 4 to 15 wt. %, relative to the complete dispersion, and which may be considered are, for example, ethylene glycol mono- or diethers, propylene glycol mono- or diethers, butylene glycol mono- or diethers of monoalcohols with an optionally branched alkyl residue of 1 to 6 carbon atoms, aliphatic alcohols with optionally branched alkyl residues with 1 to 12 carbon atoms, araliphatic and cycloaliphatic alcohols, such as benzyl alcohols or cyclohexanol, aromatics such as xylene or ketones, such as methyl isobutyl ketone, wherein the solvents may be used individually or as a mixture. Ethylene glycol monoethyl ether, ethylene glycol monomethyl ether, methoxypropanol, ethoxypropanol and/or benzyl alcohol are preferred. The epoxy resin dispersion preferably contains approximately 4 to 10 wt. % of organic solvent.

The average particle size of the dispersed epoxy resin in the dispersion is generally no greater than 1.0 μm and is preferably 0.3 to 0.8 μm. The proportion of epoxy resin in the dispersion is, for example, 20 to 70 wt. %, preferably approximately 25 to 55 wt. %.

The coating compositions according to the invention contain a total of 40 to 90 wt. % of water (component C) and 3 to 30 wt. % of organic solvents (component D), relative to the complete coating composition. These solvents are preferably those as described above by way of example for the production of the aqueous epoxy resin dispersion.

The coating composition according to the invention additionally contains one or more chlorinated polyolefin resins (component B) in a weight ratio of (solid) epoxy resin-:(solid) chlorinated polyolefin of 10:0.5 to 10:4.5.

Chlorinated polyolefins which may be used are, for example, customary commercial materials. These are in particular chlorinated polyethylene, chlorinated polypropylene or chlorinated copolymers thereof. Mixtures of such polymers may also be used. They preferably have a degree of chlorination of 15 to 45 wt. %. The molecular weight of the chlorinated polyolefins (CPO) is preferably 700 to 70,000. They may be present as a powder, as an aqueous slurry or preferably as a solution in organic solvents. The solvents preferably have a boiling range of 100° to 160° C. Suitable solvents are in particular hydrocarbons, preferably aromatic hydrocarbons. The solids content of the preferred CPO solutions is 20 to 60 wt. %.

The coating compositions according to the invention may furthermore contain pigments, extenders and customary lacquer additives. Pigments and/or extenders which may be added are customary organically or inorganically based pigments or extenders. Examples of such substances are titanium dioxide, aluminium silicate, barium sulphate, silicon dioxide. Customary lacquer additives are, for example, antifoaming agents, levelling agents, catalysts, anti-cratering and wetting agents.

The coating compositions according to the invention are one-component physically drying coating compositions. They are stable in storage and, optionally once adjusted to spraying viscosity, may be applied directly to appropriate substrates. They contain neither polyamine hardeners nor other crosslinking agents.

The coating compositions according to the invention may, for example, be produced by mixing at least one water-borne epoxy resin with at least one chlorinated polyolefin as a powder, slurry or organic solution by means of vigorous dispersion.

To this end, completely deionised water and optionally further amounts of one or solvents, in particular aromatic solvents, are added in order to produce a favourable viscosity for dispersion.

Dilution may proceed in a single stage, optionally also in two or more stages or continuously. Since the viscosity for optimum dispersion is generally higher than a suitable storage viscosity, a step-wise process is favourable. Customary dispersion and homogenisation units are suitable for dispersion, such as for example high speed stirrers, rotor/stator mixers, high pressure homogenisers or ultrasound homogenisers. Dispersion may optionally be promoted by raising the temperature, for example to up to 80° C.

Stable aqueous emulsions are obtained. It is not necessary to use emulsifiers. The emulsions or the coating compositions according to the invention preferably contain no emulsifiers. Further quantities of epoxy resin may be added to these emulsions. These resins may be the same or different epoxy resins to those used in the production of the CPO/epoxy resin emulsion.

Pigments, extenders and further additives may now be added. The pigments and extenders are thoroughly dispersed, optionally also ground, with the other constituents. This is achieved by processes familiar to the person skilled in the art. The pigments and extenders are optionally separately ground in a wetting agent.

The coating compositions according to the invention are stable dispersions which exhibit no sedimentation or phase separation even on relatively extended storage.

The coating compositions according to the invention may, for example, be applied by brushing, dipping or spraying. After application to the substrate, the coating films are dried. This may proceed at room temperature or at elevated temperatures of up to, for example, 80° C. This temperature may be adjusted to the temperature sensitivity of the substrate.

The substrates are preferably plastic substrates. Examples are modified or unmodified polyolefins, in particular polyethylene and polypropylene substrates, polycarbonates, polyamides, polystyrenes, acrylonitrile/butadiene/styrene copolymers, polyurethanes or polyesters. The plastics may, for example, be reinforced with glass fibre.

The coating compositions according to the invention are in particular used for coating plastic substrates in the automotive industry. They are particularly suitable as keying primers, in particular for automotive repair lacquer coating.

The keying primers prepared with the coating compositions according to the invention have universally good adhesion to the most varied plastic substrates. Their very good intrinsic adhesion even directly to unpretreated, relatively non-polar plastic surfaces is particularly advantageous in this connection.

The keying primers according to the invention have good non-sag properties even on vertical surfaces. They may straightforwardly be overcoated with other primers and multi-layer coatings may be produced with further coating compositions.

The following examples are intended to illustrate the invention.

EXAMPLE 1

Production of an epoxy resin a) Production of condensation product C)

150 g of technical grade polyethylene glycol with an average molecular weight ($M_w$) of 3,000 and 18.5 g of a bisphenol A-based polyglycidyl ether with an epoxy equivalent weight of 185 were together heated to 100° C. and stirred together with 0.9 g of BF-etherate, diluted to 5 wt. % with dioxane. The temperature was then raised to 130° C. and the temperature maintained until the reaction had subsided, which could be detected by an increase in the epoxy equivalent weight. The equivalent ratio of OH:epoxy was 1:1, the epoxy equivalent weight approximately 360,000.

b) Production of the epoxy resin dispersion 325 g of a bisphenol A-based epoxy resin with an epoxy equivalent of 183 were reacted in a 2 litre three-necked flask fitted with a thermometer, paddle mixer, reflux condenser and dropping funnel with 98 g of bisphenol A and 27 g of the condensation product 1a) in the presence of 750 mg of triphenylphosphine at 150° C. to 160° C. up to an epoxy equivalent of 490 to 500. The mixture was diluted while being cooled with 27 g of benzyl alcohol and 60 g of methoxypropanol. At a temperature of below 100° C., 105 g of deionised water were added at a constant rate over a period of 5 to 30 minutes at a stirring speed of approximately 800 rpm, reducing the temperature to 70° to 60° C., wherein an aqueous dispersion was obtained which was subsequently further diluted with 173 g of deionised water. The dispersion had a solids content of 55.7 wt. %, a viscosity of 11,700 mPa.s (Brookfield spindle 3 to 6 rpm) and a particle size of 0.66 μm.

EXAMPLE 2

Production of a primer 3.6 wt. % of a customary commercial CPO solution (40% in xylene, CPO 343-1) are mixed with 2.4 wt. % of Solvesso 100 and added with vigorous stirring to 10.9 wt. % of an aqueous epoxy resin dispersion according to example 1. 1.0 wt. % of a customary commercial rheological auxiliary (based on montmorillonite) was initially stirred into this mixture and then 82.1 wt. % of completely deionised water. The mixture is stirred for 15 minutes.

The weight percentages relate to the complete coating composition.

EXAMPLES 3 to 7

Further primers with differing compositions are produced as in example 2. The quantities of the constituents used are stated in the table below. A customary commercial aqueous amine hardener is stirred into the coating composition produced according to example 7 shortly before application.

| Example* | 3 | 4 | 5 | 6 | 7 (comparison) |
|---|---|---|---|---|---|
| Epoxy resin dispersion according to example 1 | 41.1 | 46.6 | 18.9 | 37.7 | 38.5 |
| CPO | 14.5 | 10.0 | 11.3 | 2.5 | 13.5 |
| Solvesso 100 | 8.9 | 3.3 | 4.8 | 10.0 | 8.3 |
| Rheological auxiliary | 3.0 | 3.0 | 2.0 | 2.0 | 3.0 |
| Completely deionised | 32.5 | 37.1 | 63.0 | 47.8 | 28.7 |

| Example* | 3 | 4 | 5 | 6 | 7 (comparison) |
|---|---|---|---|---|---|
| water | | | | | |
| Amine hardener | — | — | — | — | 8.0 |

*Weight percentages relative to the complete coating composition.

PRACTICAL EXAMPLE

The primers produced according to examples 2 to 7 are directly applied onto various unpretreated plastic substrates (see table). The coating is then dried for 30 minutes at room temperature. The properties of the resultant lacquer coatings are shown in the following table.

| Example* | 2 | 3 | 4 | 5 | 6 | 7 (comparison) |
|---|---|---|---|---|---|---|
| Surface | OK | OK | OK | OK | OK | OK |
| Adhesion to PP | OK | OK | OK | OK | OK | not OK |
| PP/EPDM | OK | OK | OK | OK | OK | not OK |

PP = polypropylene
EPDM = ethylene/propylene/diene copolymer

We claim:

1. An aqueous coating composition based on one or more water-borne, self-emulsifying epoxy resins, comprising
    A) about 1 to about 40 wt. % of one or more water-borne self-emulsifying epoxy resins with an epoxy equivalent weight of 250 to 10,000, which is obtained by condensation of
        a) about 50 to about 80 wt. % of one or more epoxy compounds with an average of at least 2 epoxy groups per molecule and an epoxy equivalent weight of 100 to 2,000,
        b) about 17 to about 35 wt. % of one or more aromatic polyols and
        c) about 3 to about 15 wt. % of a condensation product prepared from one or more aliphatic polyols with a weight-average molecular weight ($M_w$) of 200 to 20,000 and one or more epoxy compounds with an average of at least 2 epoxy groups per molecule and an epoxy equivalent weight of 100 to 2,000, wherein the equivalent ratio of OH groups to epoxy groups is 1:0.85 to 1:1.5 and the epoxy equivalent weight of this condensation product is at least 50,000;
    B) one or more chlorinated polyolefins (CPO) in a weight ratio of epoxy resin (component A): CPO (component B) of 10:0.5 to 10:4.5, in each case relative to the weight of resin solids,
    C) about 40 to about 90 wt. % of water,
    D) about 3 to about 30 wt. % of one or more organic solvents,
    wherein the weight percentages of A), C) and D) relate to the weight of the complete aqueous coating composition and the coating composition contains no crosslinking agents.

2. An aqueous coating composition according to claim 1 which is free of emulsifier.

3. A process comprising coating the aqueous coating composition according to claim 1 or 2 on to plastic substrates.

4. A process comprising applying the aqueous coating composition according to claim 1 or 2 to a substrate as a repair lacquer coating primer.

5. A process comprising applying the aqueous coating composition according to claim 1 or 2 to an automotive substrate as a repair lacquer coating primer.

6. A process for the production of a primer repair lacquer coating which comprises applying an aqueous coating composition according to claim 1 or 2 to a substrate and drying the resultant coating film at a temperature from room temperature to 80° C.

7. An aqueous coating composition according to claim 1 further comprising a pigment, extender, lacquer additive or combination thereof.

8. A process according to claim 4 wherein the substrate is plastic.

9. A process according to claim 5 wherein the substrate is plastic.

10. A process according to claim 6 wherein the substrate is plastic.

* * * * *